United States Patent [19]

Yanagawa

[11] 4,455,024
[45] Jun. 19, 1984

[54] ELECTRONIC GAME APPARATUS

[75] Inventor: Mikio Yanagawa, Tokyo, Japan

[73] Assignee: Casio Computer Co., Ltd., Tokyo, Japan

[21] Appl. No.: 357,706

[22] Filed: Mar. 12, 1982

[30] Foreign Application Priority Data

Mar. 31, 1981 [JP] Japan ................................ 56-48000

[51] Int. Cl.³ .............................................. A63F 9/00
[52] U.S. Cl. ........................... 273/85 G; 273/DIG. 28
[58] Field of Search ............. 273/DIG. 28, 85 G, 378

[56] References Cited

U.S. PATENT DOCUMENTS 4,398,086  8/1983  Smith ................................. 364/410

*Primary Examiner*—Richard C. Pinkham
*Assistant Examiner*—Leo P. Picard
*Attorney, Agent, or Firm*—Frishauf, Holtz, Goodman & Woodward

[57] ABSTRACT

An electronic game apparatus having a display unit which is capable of displaying at least a series of numbers and decimal points the number of which is equal to the number of the series of numbers. Among the numbers, any number part of which is not displayed is defined as a target. The target is shifted toward one direction. With one of the function keys, a missile the shape of which corresponds to the non-displayed portion of the target is shifted toward a direction opposite to that of the target. When the non-displayed portion of the target is hit by the missile so as to complete the figure, the decimal point in an effective firing range (display frame or digit) where a missile digit and a target digit coincide disappears. Thus, points are made. The game continues until the missiles which have been given at the start of the game are used up. Points at each stage are added and final score is displayed when the game is over.

10 Claims, 30 Drawing Figures

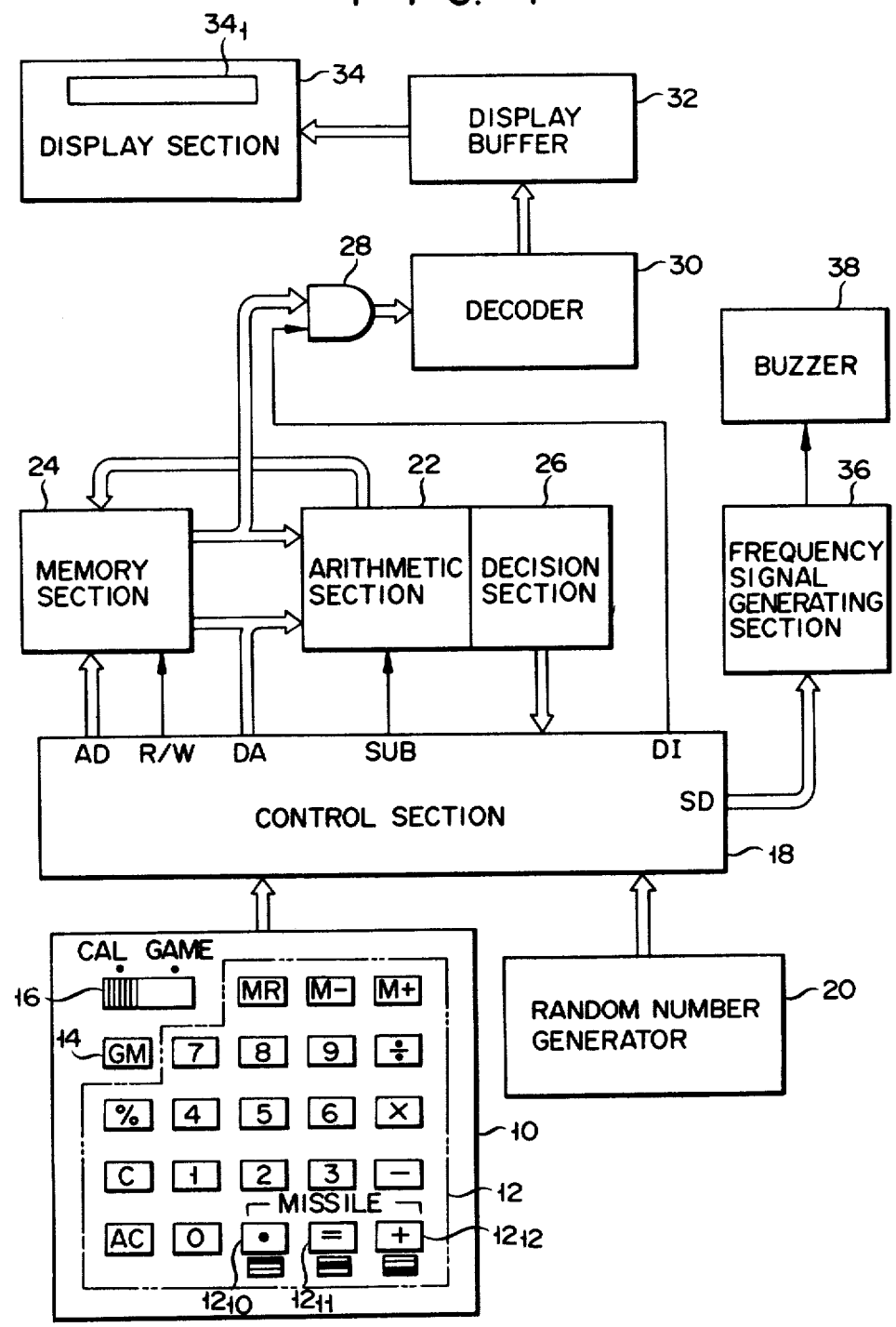
F I G. 1

FIG. 2
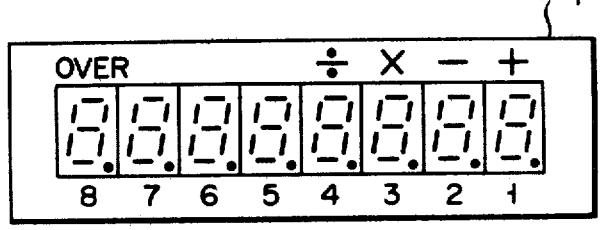
FIG. 7
| SYMBOL | NUMBER OF MISSILES |
|---|---|
| NO SYMBOL | 1 ~ 8 MISSILES |
| + | 9 ~ 16 MISSILES |
| − + | 17 ~ 24 MISSILES |
| × − + | 25 ~ 32 MISSILES |
| ÷ × − + | 33 ~ 40 MISSILES |
FIG. 15
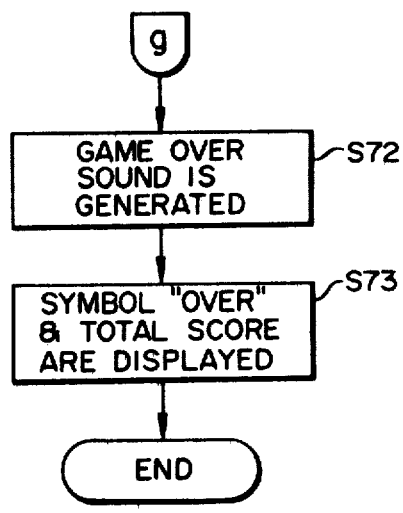

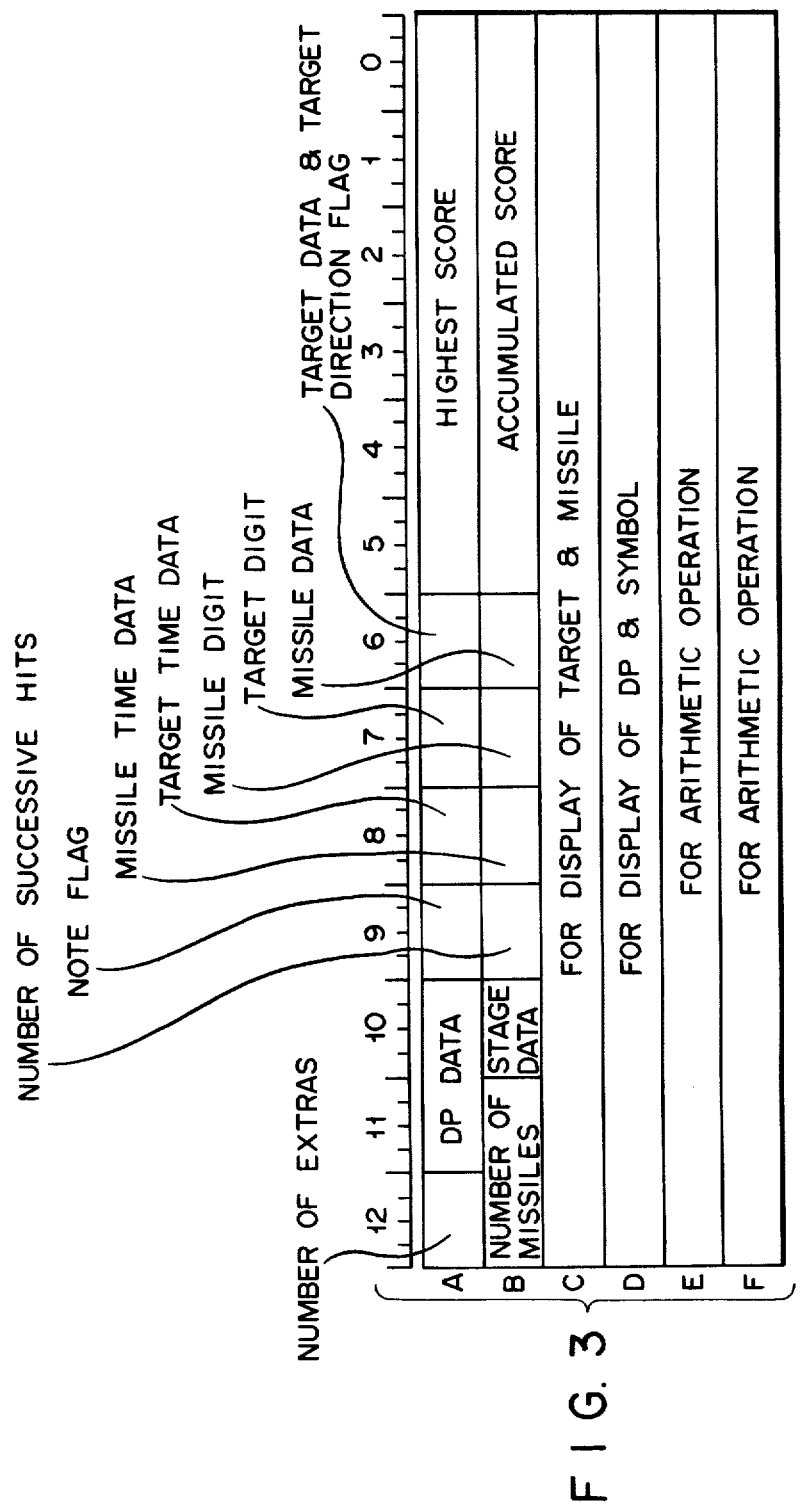

FIG. 4A

| TARGET DIRECTION FLAG | SHIFT DIRECTION |
|---|---|
| 1 | LEFT |
| 0 | RIGHT |

FIG. 4B

| TARGET DATA | DISPLAY | |
|---|---|---|
| 0 0 0 | E | EXTRA |
| 0 0 1 | H | HIGH |
| 0 1 0 | H | HIGH |
| 0 1 1 | M | MIDDLE |
| 1 0 0 | L | LOW |
| 1 0 1 | L | LOW |
| 1 1 1 | M | MIDDLE |

FIG. 4C

| MISSILE DATA | DISPLAY | |
|---|---|---|
| 0 0 0 | / | |
| 0 0 1 | H | HIGH |
| 0 1 0 | M | MIDDLE |
| 0 1 1 | L | LOW |

FIG. 5

| VARIATION | STAGE | STAGE DATA | MISSILES | TARGETS | TARGET SPEEDS (m SEC.) | MISSILE SPEEDS (m SEC.) | BASIC POINTS | EXTRA POINTS | REWARD FOR PERFECT FIRING |
|---|---|---|---|---|---|---|---|---|---|
| 1 | 1 | 0001 | STRAIGHT | STRAIGHT | 560 | 283 | 10 | 100 | 1000 |
| | 2 | 0010 | | | 560 | | | | |
| | 3 | 0011 | | | 450 | | | | |
| 2 | 1 | 0100 | STRAIGHT | FIXED CURVE | 560 | | 20 | 200 | 2000 |
| | 2 | 0101 | | | 560 | | | | |
| | 3 | 0110 | | | 450 | | | | |
| 3 | 1 | 0111 | STRAIGHT | UNFIXED CURVE | 560 | | 40 | 400 | 4000 |
| | 2 | 1000 | | | 560 | | | | |
| | 3 | 1001 | | | 450 | | | | |
| 4 | 1 | 1010 | FIXED CURVE | STRAIGHT | 560 | | 60 | 600 | 6000 |
| | 2 | 1011 | | | 560 | | | | |
| | 3 | 1100 | | | 450 | | | | |
| 5 | 1 | 1101 | FIXED CURVE | UNFIXED CURVE | 560 | | 100 | 1000 | 10000 |
| | 2 | 1110 | | | 560 | | | | |
| | 3 | 1111 | | | 450 | | | | |

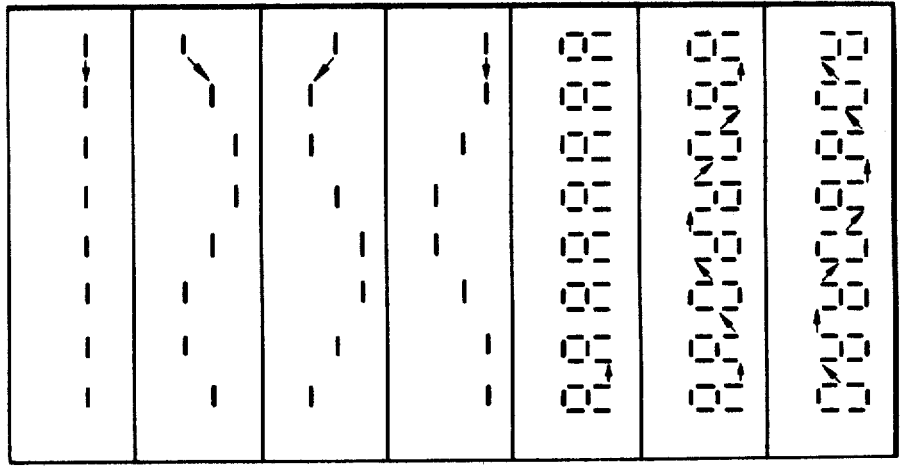

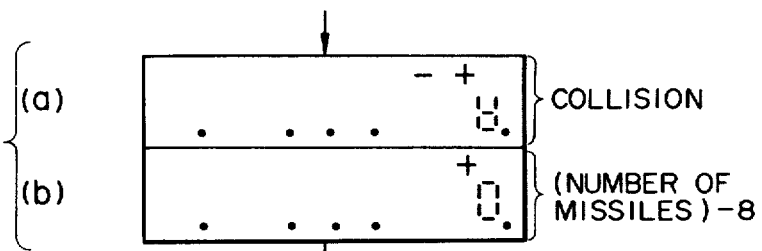
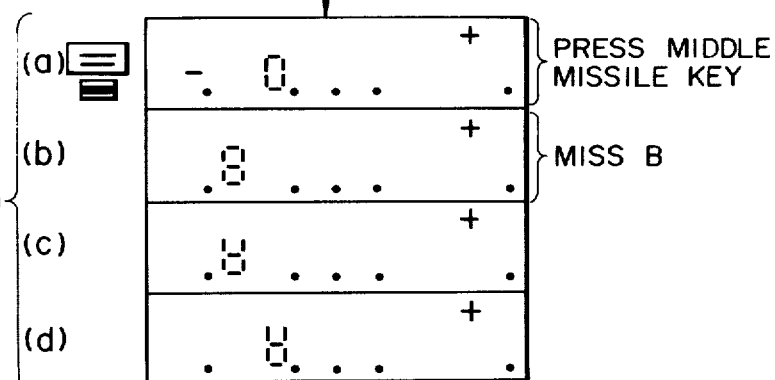
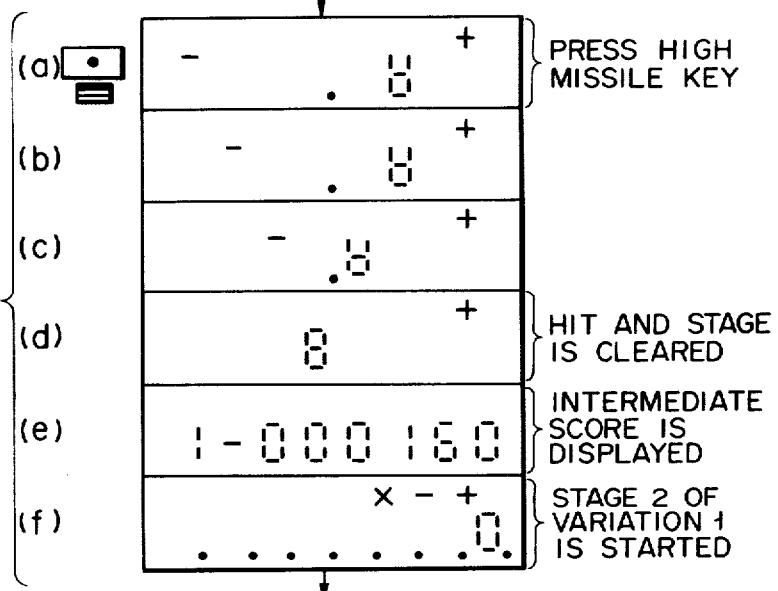

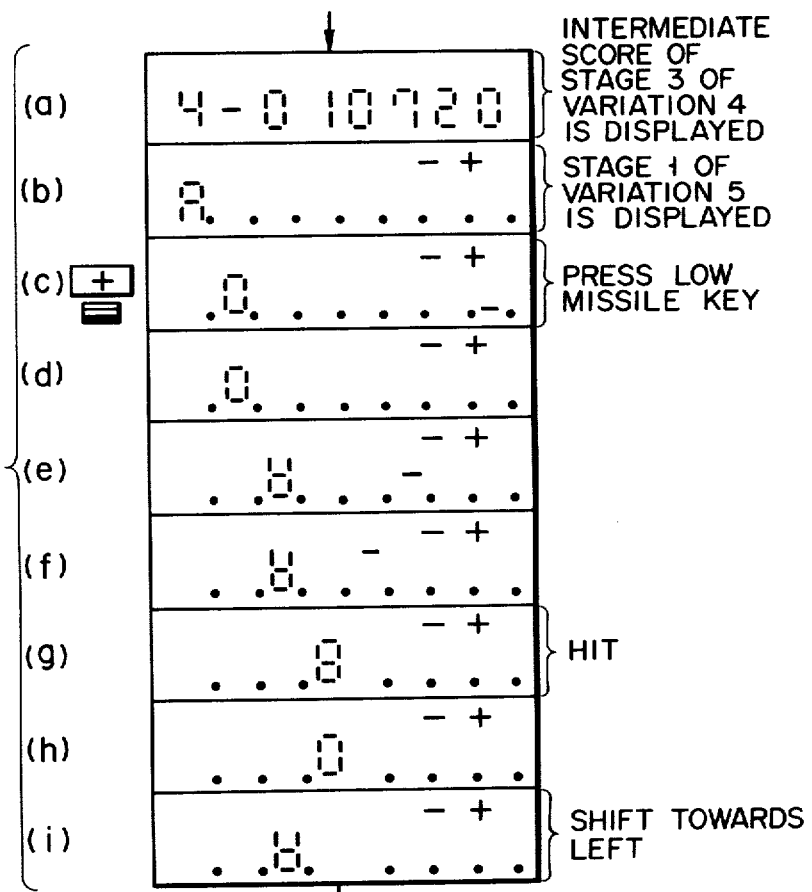
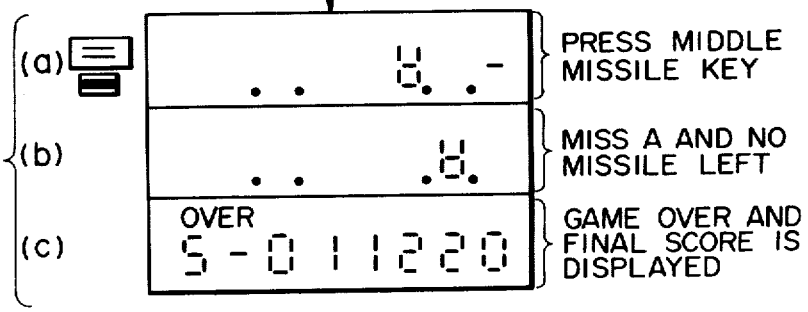

ELECTRONIC GAME APPARATUS

BACKGROUND OF THE INVENTION

The present invention relates to an electronic game apparatus and, more particularly, to a system with which a game is played using a display unit and keys of a compact electronic type calculator (to be referred to as an electronic calculator hereinafter).

Recently, various electronic game apparatuses are commercially available. Most of these electronic game apparatuses use a special display symbol such as an animation symbol and a number of game keys.

Various electronic calculators are also commercially available. Some of them have various functions such as a timepiece function and an alarm sound generating function, in addition to their original calculating function. Thus, various functions are combined together. Similarly, various electronic watches are commercially available. Some of them have various combined functions.

SUMMARY OF THE INVENTION

It is an object of the present invention to provide an electronic game apparatus with which a game is played using a small number of keys and a display unit which is capable of displaying simple symbols or marks, and in which a game function is combined with other functions easily.

This object has been achieved by the electronic game apparatus which comprises: display means for displaying a plurality of signs or figures; memory means, connected to said display means, for storing target data for displaying a predetermined sign except part thereof among the plurality of signs, missile data for displaying a missile a shape of which corresponds to the non-displayed part of the predetermined sign so as to complete the shape of the predetermined sign, data for shifting the target and the missile, and data for scoring a point when the missile hits the target; arithmetic and logic means, connected to said memory means, for calculating a shift pattern of the target and the missile, for comparing a position of non-displayed part of the target and a position of the missile, and for calculating a score when the position of the non-displayed part of the target and the position of the missile are judged to coincide; control means, connected to said display means, said memory means and said arithmetic and logic means, for controlling at least data transfer from said memory means to said display means, data transfer from said memory means to said arithmetic and logic means and from said arithmetic and logic means to said memory means, and arithmetic and deciding operation of said arithmetic and logic means; and input key means, connected to said control means, for entering missile data, whereby said control means controls said display means, said memory means and said arithmetic and logic means on the basis of input data so as to allow performance of the game while displaying the movement of the target and missile at said display means.

According to the present invention, part of the sign which is not displayed at the display means and this sign is defined as a target. The shape of the non-displayed part of the sign corresponds to that of the missile which shoots the target. When the missile hits the target, a complete sign is formed and a point is scored. With a display unit which is capable of displaying simple signs and a small number of keys, a game is played with an electronic calculator or an electronic watch which, in turn, performs the original function easily. Thus, the original function of the electronic calculator or the electronic watch is easily combined with the game function, thus increasing the value added of electronic equipment. Further, according to the present invention, since a conventional display unit can be used, an apparatus with the game function can be manufactured at low production costs. In this game, the target and the missile can be moved independently of each other and the altitude of the target and the missile can be changed variously. Therefore, the game according to the present invention is a target shooting game with speedy and precise action.

BRIEF DESCRIPTION OF THE DRAWINGS

By way of example and to make the description clearer, reference is made to the accompanying drawings in which:

FIG. 1 is a schematic block diagram of a compact electronic calculator according to one embodiment of the present invention when the present invention is applied to the compact electronic calculator;

FIG. 2 is an enlarged view of a liquid crystal display element unit $34_1$ of FIG. 1;

FIG. 3 is a view for explaining data stored in registers which constitute a memory section 24 of FIG. 1;

FIGS. 4A to 4C are tables for explaining a target direction flag, target data and missile data, as shown in FIG. 3;

FIG. 5 is a table for explaining a trajectory of the missile, a change in the target and a method for scoring points in the game according to the embodiment of the present invention;

FIGS. 6A to 6G are views for explaining a change in the target and the missile of the game of the present invention;

FIG. 7 is a table for explaining the meanings of signs of the liquid crystal display element unit $34_1$ of FIG. 2;

FIGS. 8 to 15 are flow charts for explaining the mode of operation of the electronic game apparatus according to the embodiment of the present invention;

DETAILED DESCRIPTION OF THE PREFERRED EMBODIMENTS

Figure 8:
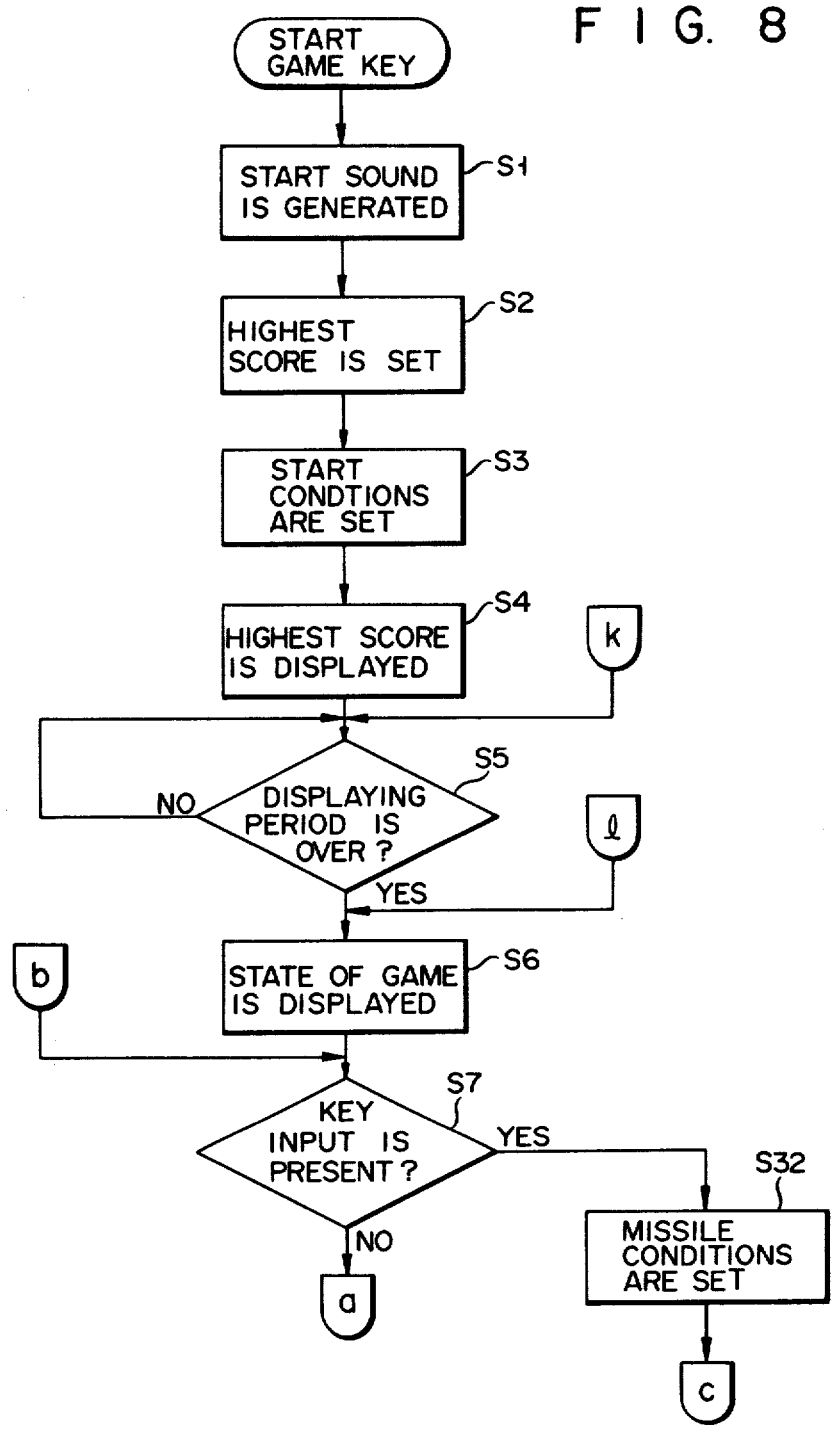

An electronic game apparatus of one embodiment of the present invention will be described with reference to the accompanying drawings when the present invention is applied to an electronic calculator.

The object of the gate of this embodiment is to hit the moving target at all effective firing ranges (display frames or digits 1 to 8) by firing missiles at the correct range and altitude (high, middle or low). Winning a game requires speedy and precise action.

The game is outlined as follows:

(1) There are 5 variations to the game and each variation has 3 stages, for a total of 15 stages;

(2) Each game begins at stage 1 of variation 1. If the target is hit successfully at all eight effecting firing ranges, the next stage will begin automatically. At this time, the target will move faster; and (3) If all 3 stages of variation 1 are won successfully, variation 2 will begin. In this variation, the target flight path will change.

(4) If all 5 variations are won, the game will begin again from variation 3.

FIG. 1 is a schematic block diagram of the electronic game apparatus according to the embodiment of the present invention. A key input section 10 comprises calculation keys 12 for entering data, selecting the type of calculation and performing the like operation, a GAME key 14 to start a game, and a mode selection switch 16 for selecting the calculation mode and the game mode. When the game mode is set, a "." key $12_{10}$, an "=" key $12_{11}$ and a "+" key $12_{12}$ among the calculation keys 12 are used as missile launch keys. The missile launch keys $12_{10}$ to $12_{12}$ have functions of shooting missiles at positions corresponding to a high horizontal segment, a middle horizontal segment, and a low horizontal segment, respectively. The key input section 10 is connected to a control section 18.

A key input signal from the key input section 10 is supplied to the control section 18. The control section 18 is connected to a random number generator 20. Random number data which is used in the game mode is generated by the random number generator 20. The control section 18 is connected to an arithmetic section 22 and output data DA is output to the arithmetic section 22 in response to the key input signal. The data DA is stored in a memory section 24 through the arithmetic section 22. The memory section 24 is connected to the arithmetic section 22. The memory section 24 is also connected to the control section 18 and receives address data AD and a read/write instruction R/W therefrom. The control section 18 also supplies an addition/subtraction instruction SUB to the arithmetic section 22. The arithmetic section 22 performs operation of data read out from the memory section 24 in response to the addition/subtraction instruction SUB. The operated results are stored in the memory section 24. In accordance with the operated results in the arithmetic section 22, the presence or absence of data and that of a carry signal are judged in a decision section 26 connected to the arithmetic section 22. The judged results are supplied to the control section 18 which is connected to the decision section 26. Display data read out from the memory section 24 is supplied to a decoder 30 connected to an AND circuit 28 which is connected to the control section 18 and which is controlled by a display instruction from the control section 18. An output from the decoder 30 is stored in a display buffer 32 which is connected to the decoder 30. A display section 34 is connected to the display buffer 32 and displays data in accordance with the decoded output stored in the display buffer 32. The display section 34 comprises, for example, a liquid crystal display element unit $34_1$ and a drive circuit (not shown). Up to 8-digit data can be displayed at the liquid crystal display element unit $34_1$, as shown in FIG. 2.

Each display frame of the liquid crystal display element unit $34_1$ is constituted by an electrode of the 日 shape and a decimal point electrode. Further, above and outside the display frames, display electrodes for symbols such as "+", "−", "×" and "÷" which indicate the calculation contents and a display electrode for indicating the end of the game, "OVER", are arranged.

When the game mode is set, the control section 18 outputs sound data SD according to the stage of a game, to a frequency signal generating section 36 which is connected to the control section 18. The frequency signal generating section 36 generates different frequency signals in response to the sound data SD input thereto. A frequency signal from the frequency signal generating section 36 is supplied to a buzzer 38 connected thereto. Thus, the buffer 38 is driven to produce a predetermined sound. There are 10 kinds of buzzer sounds, that is, a start sound, a target shift sound, a missile shift sound, a hit sound, a miss sound A, a miss sound B, an extra hit sound, a collision sound, a frame clear sound and a game over sound.

In this embodiment, figures "ㄴ|", "ㄴ]" and "刊" are displayed as the targets by the electrode of the 口 shape. One of the targets is shifted to the right or left. On the other hand, with one of the missile launch keys $12_{10}$ to $12_{12}$ a missile in the high middle or low attitude is shifted to a direction opposite to the target shift direction. When the missile hits the target in one of the digits of the liquid crystal display element unit $34_1$, that is, one of the effective firing ranges, and when the target and the missile constitute the completed figure "日", the decimal point in this digit disappears. With less than given missiles, when 8 decimal points are erased, the next stage is started. When 3 stages are completed, the next variation is initiated. However, when the decimal points cannot be erased within the predetermined conditions, the game is over. The total (accumulated) score is calculated by basic points which are given when a decimal point is erased, extra points, and a reward for perfect firing. In order to execute the above game operation, the memory section 24 comprises, for example, registers as shown in FIG. 3.

In particular, the memory section 24 has A to F registers of 13 digits. In the A register are written the number of extras in the 12th digit, decimal point (DP) data in the 11th and 10th digits, a note flag in the 9th digit, target time data in the 8th digit, target digit data in the 7th digit, target data and a target direction flag in the 6th digit, and a highest score data in the 0th to 5th digits. In the B register are written the number of missiles in the 12th and 11th digits, stage data in the 10th digit, the number of successive hits in the 9th digit, missile time data in the 8th digit, missile digit data in the 7th digit, missile data in the 6th digit and the accumulated score data in the 0th to 5th digits. The C register is used for displaying the target and the missile. The D register is used for displaying the DP and the symbols "+", "−", "×" and "÷". The E and F registers are used for arithmetic operation.

As for the target direction flag stored in the A register, when the logical "1" is stored, the target is shifted to the left. On the other hand, when the logical "0" is stored, the target is shifted to the right. The target data stored in the A register is a 3-bit data and includes 7 types of data beginning from "000" to "110". Thus, the figures "日", "ㄴ|", "ㄴ]" and "刊" are displayed. In particular, the complete figure "日", and figures with the high, middle and low horizontal segments of which are not displayed, respectively, are displayed.

The missile data stored in the B register is 4-bit data, as shown in FIG. 4C, and includes 4 types of data beginning from "000" to "011". In the binary coded data "000", the missile is not displayed. The missiles which correspond the positions of the non-displayed segment of the complete figure in the high, middle and low altitudes are displayed in response to data "001" to "011". The missile data "001" to "011" are set by the missile launch keys $12_{10}$ to $12_{12}$ respectively.

Five kinds of variations 1 to 5 are prepared in this game, as shown in FIG. 5. The trajectory mode, the target speed mode, the target speed mode, the missile speed mode, and the scoring mode are set for each variation. Each variation comprises stages 1 to 3. The variations and the step thereof are set by stage data of 4 bits. Changes in the missile trajectory and target position are determined in each variation. However, these are the same in stages 1 to 3 for all the variations. There are two types of routes of the trajectory and the target, that is, a straight route and a curved route to be described later. The speed of the target passing through the display frames is 560 msec in stages 1 and 2. It is 450 msec in stage 3. The speed of the missile passing through the display frames is 283 msec in all the stages. There are three types of scoring points such as the basic point, the extra point and the reward for perfect firing. The basic points are set to "10", "20", "40", "60" and "100" in variations 1 to 5, respectively. The extra point is set to be ten times the basic point and the reward for perfect firing is set to be one hundred times the basic point.

FIGS. 6A to 6G show changes in the trajectory and the target. There are two trajectories, that is, a straight trajectory and a curved trajectory. On the straight trajectory, the missile is moved straight to the left (or right) from the the launched position, as shown in FIG. 6A. In particular, in FIG. 6A, the missile of the middle altitude is launched by pressing the missile key $12_{11}$. Similarly, when the missile key $12_{10}$ or $12_{12}$ is pressed, a missile of high or low altitude can be launched and moved straight to the left (or right). On the other hand, when the trajectory is curved, the missile launched from a predetermined position is shifted in a curved manner, as shown in FIGS. 6B to 6D. Referring to FIGS. 6A to 6D, a case is described wherein the missile is launched from the right and shifted to the left. In the similar manner, the missile can be shifted to the right. There are two types of targets, that is, a straight moving target and a curved moving target. When the moving target moves straight, the position of the target is moved straight to the right (or left), as shown in FIG. 6E. There are two types of changes in the curve pattern. As shown in FIG. 6F, the change in the curve pattern is fixed in one case. On the other hand, the change in the curve pattern is unfixed in the other case as shown in FIG. 6G. Referring to FIGS. 6E to 6G, the target is shifted to the right. Similarly, the target can be shifted to the left.

FIG. 7 shows a relation between symbols and the number of missiles corresponding thereto. The number of missiles are set to be 24 at the beginning of the game. When each stage is comleted, 16 missiles are added. Thus, 40 missiles at maximum can be used. The ranges of the number of missiles are indicated by a combination of the symbols, as shown in FIG. 7. If the number of missiles to be used is in a range of 1 to 8, no display is made. If it is in a range of 9 to 16, the symbol "+" is displayed. If it is in a range of 17 to 24, the combination of symbols "− +" is displayed. If it is in a range of 25 to 32, the combination of symbols "× − +" is displayed. Further, if it is in a range of 33 to 40, the combination of symbols "÷ × − +" is displayed.

Figure 9:
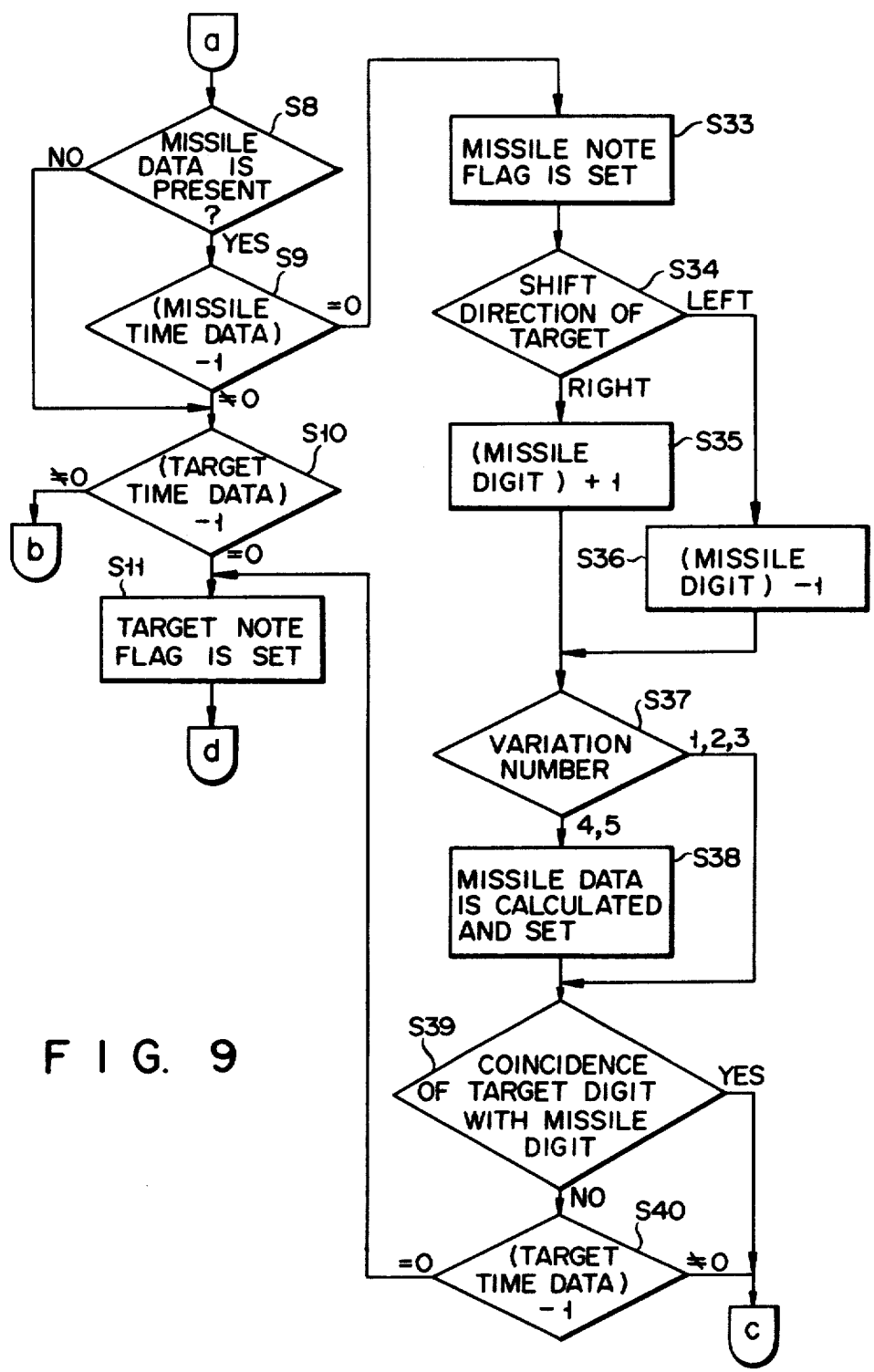
Figure 10:
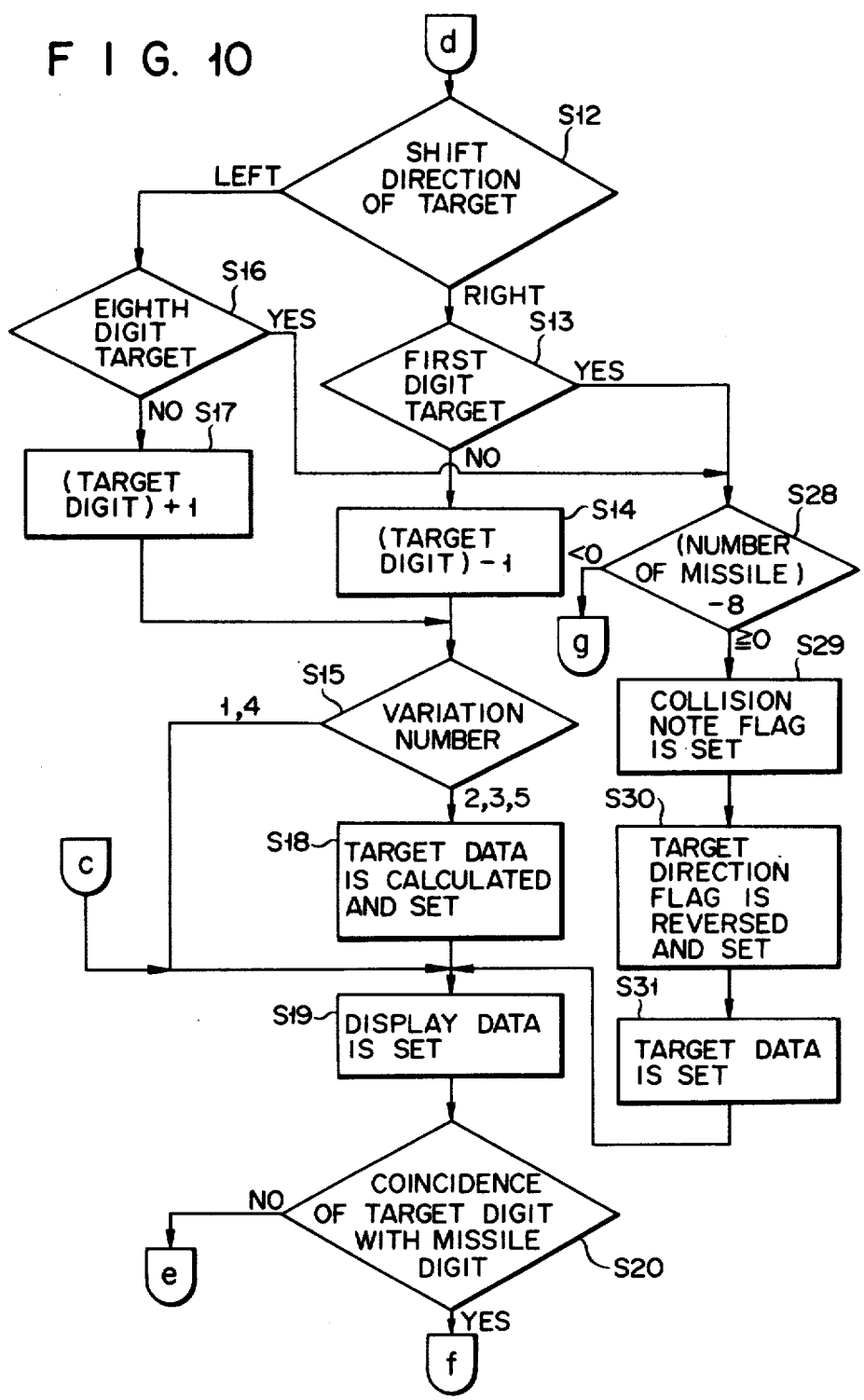
Figure 11:
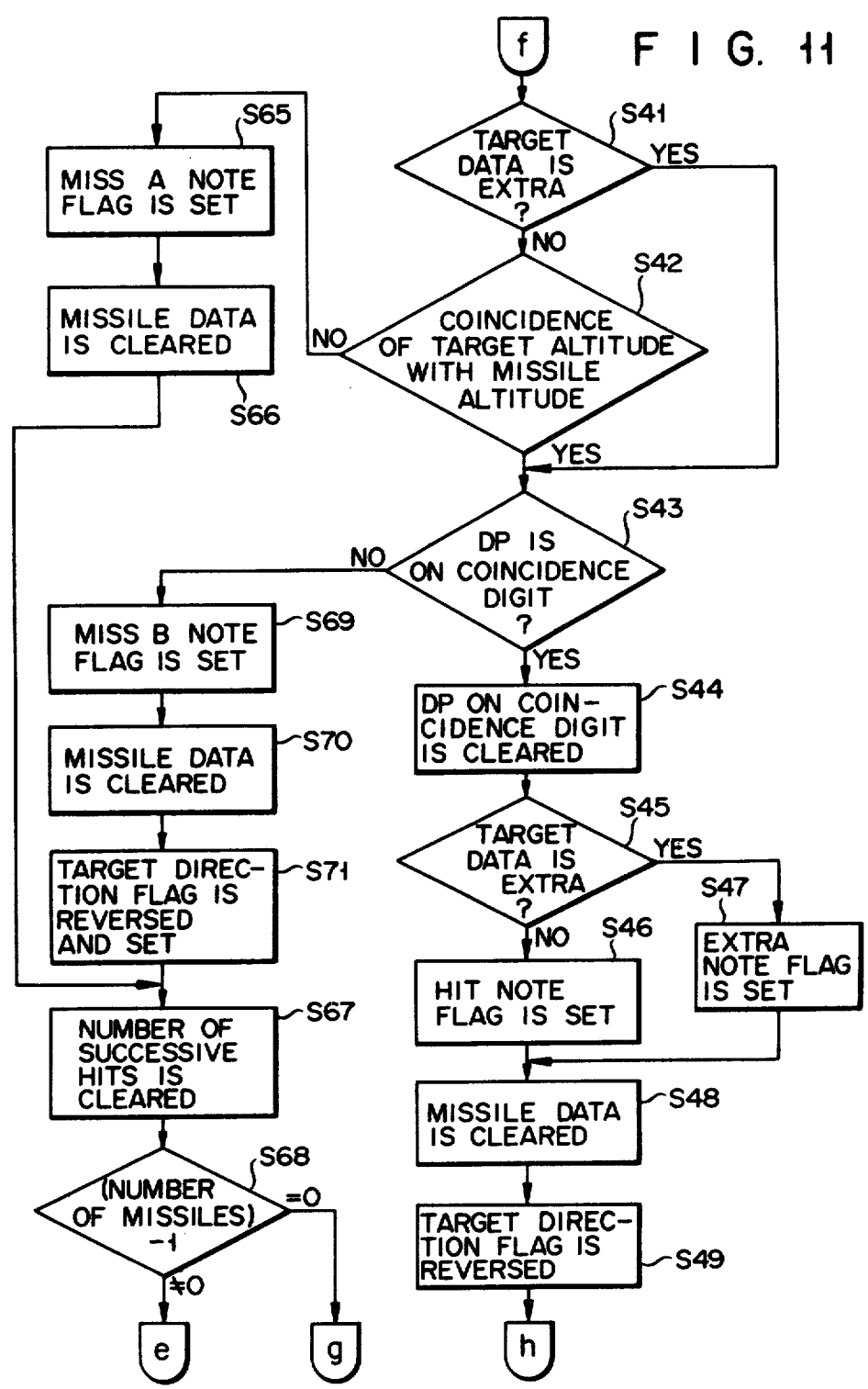
Figure 12:
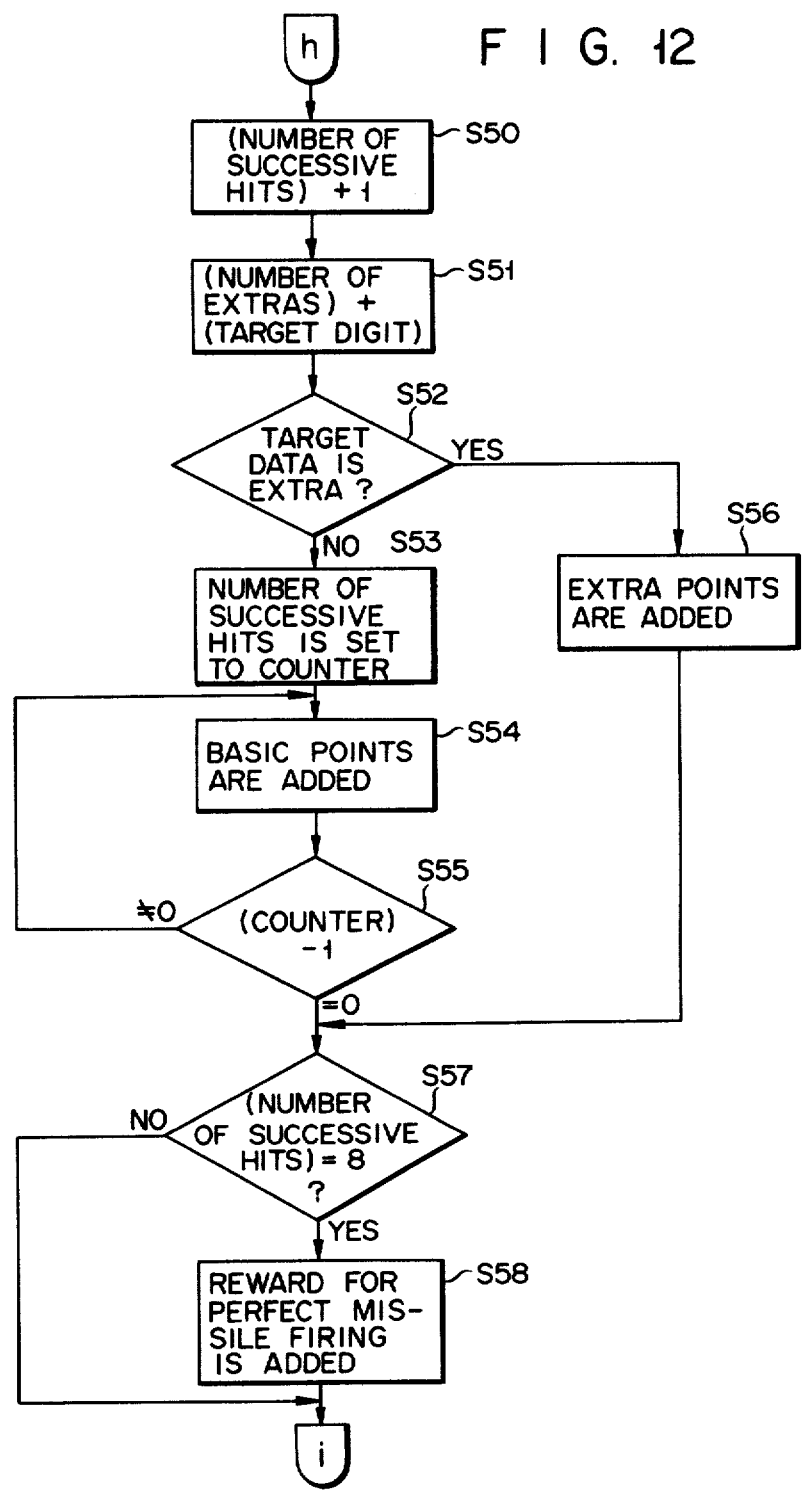
Figure 13:
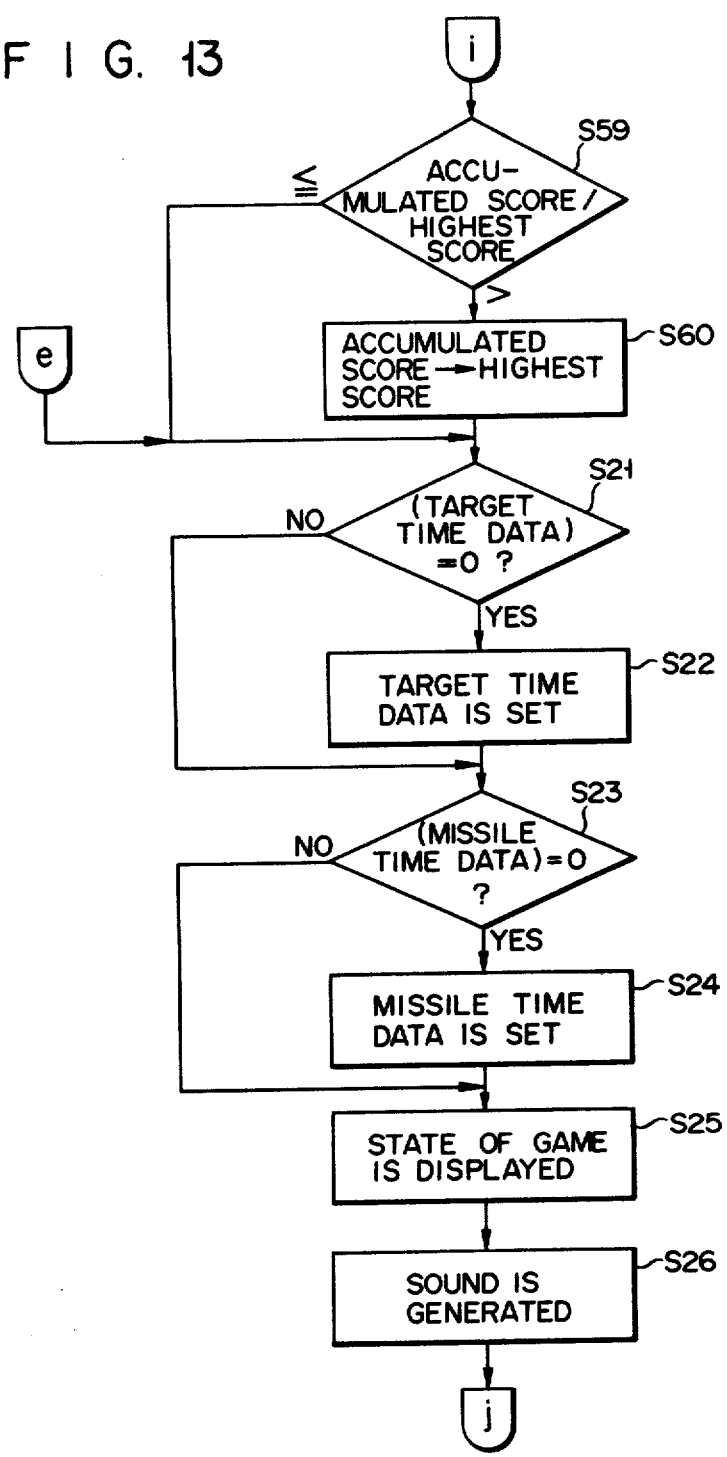
Figure 14:
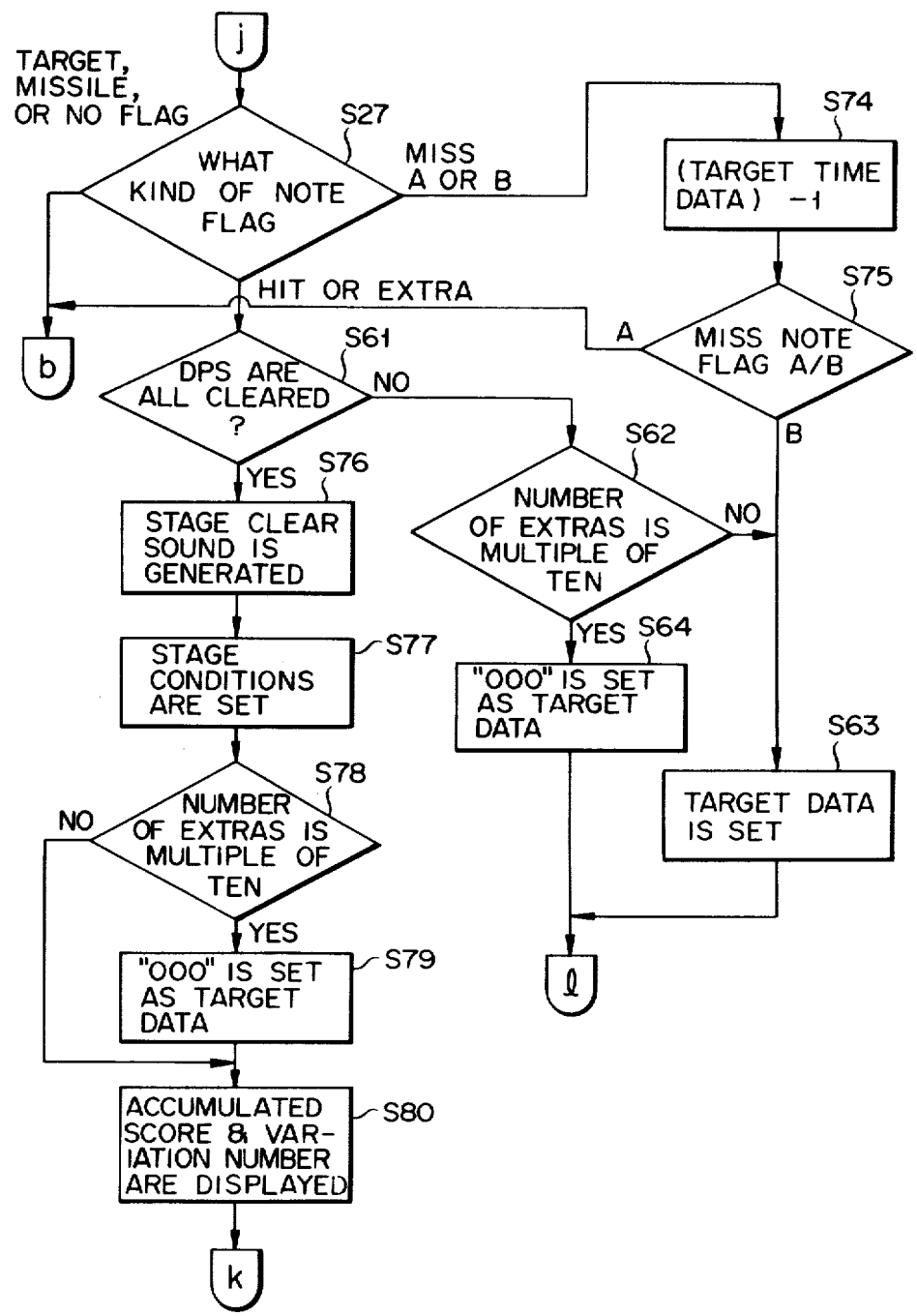
Figure 16A:
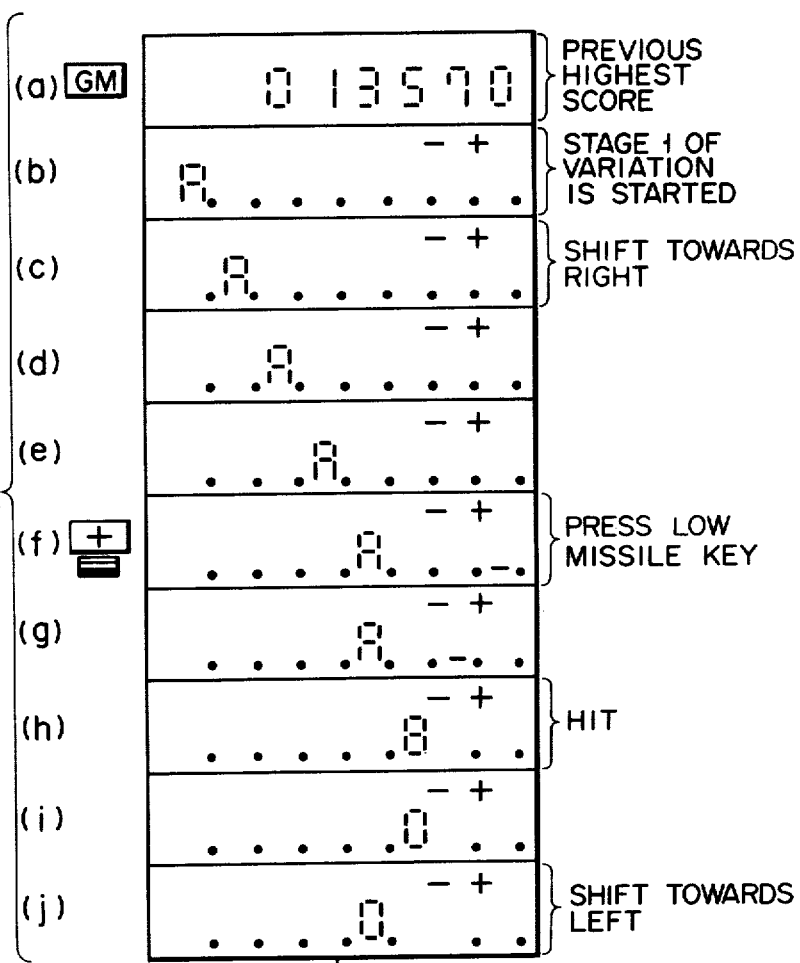
FIGS. 16A(a) to 16G(c) are views for explaining the mode of operation of the electronic game apparatus according to the embodiment of the present invention, using the liquid crystal display element unit $34_1$ of FIG. 2.

The mode of operation of the electronic game apparatus according to the above embodiment of the present invention will be described with reference to the flow charts of FIGS. 8 to 15. Since the calculation function of the electronic calculator is known well, the detailed description thereof will be omitted. Only the game function of the electronic calculator will be described which is the gist of the present invention. When the game mode is to be initiated, the mode selection switch 16 is set to the game mode. The GAME key 14 is then pressed. A series of operations as shown in the flow charts of FIGS. 8 to 15 are performed at the control section 18 and other sections related to the game function. When the GAME key 14 is pressed, the sound data SD is supplied from the control section 18 to the frequency signal generating section 38. The frequency signal generating section 38 then generates a predetermined frequency signal to drive the buzzer 38. In other words, when the GAME key 14 is pressed, the start sound is generated at the buzzer 38 as shown in step S1 of FIG. 8. In step S2, data for the previous highest score stored in the A register of the memory section 24 is transferred to the C register. Thereafter, in step S3, data for starting conditions of the game is set in the memory section 24. In particular, the control section 18 serves to set in the memory section 24 target data in accordance with a random number supplied from the random number generator 20. Further, the control section 18 serves to set eighth digit in the target digit. Further, target time data and missile time data respectively corresponding to the target speed and the missile speed are set. Eight decimal points as the decimal point data, 24 missiles as the number of missiles, stage data "0001" which indicates stage 1 of variation 1, the target detection flag of "0" (shift to the right) are also set. In this stage, the other data in the A and B registers are all cleared. The program then advances to step S4. Data for the highest score is read out from the C register of the memory section 24 and displayed at the liquid crystal display element unit $34_1$. The display time is checked in step S5. When a predetermined period of time, for example, 1 second, elapses, the highest score disappears at the liquid crystal display element unit $34_1$ and, in turn, the game ready mode shown in step S6 is displayed thereat. In step S6, stage 1 of variation 1 is started at first. The figure "F" appears in the 8th display frame (effective firing range) as shown in FIG. 16A(b). At the same time, the combination of symbols "− + " which indicates 24 missiles is displayed. The program advances to key sampling step S7. It is judged in this step whether the missile launch keys $12_{10}$ to $12_{12}$ are pressed. If it is judged that the keys are not pressed, the program advances to step S8 (FIG. 9). When missile data is set in the B register, depression of missile launch keys $12_{10}$ to $12_{12}$ cannot be regarded as being pressed in step S7. It is judged in step S8 whether missile data is present. If it is judged that the missile data is present, it is judged in step S9 whether "(missile time data) −1" is "0". If it is judged that the "(missile time data) −1" is not "0", the program advances to step S10. Even if it is judged in step S8 that missile data is not present, the program advances to step S10. In step 10, the calculation of "(target time data)−1" is performed and it is judged whether the calculated result is "0". If the calculated result is not "0", the program returns to step S7. The calculation of the time data in steps S9 and S10 is performed by setting time data set in the A and B registers in a certain digit of the E register and by subtracting one from the data set in the E register. Steps S7 to S9 are repeated until the calculated result in step S10 becomes "0". Meanwhile, if it is judged that the missile keys $12_{10}$ to $12_{12}$ are not pressed and the calculated result of "(target time data)−1" becomes "0", that is, it is judged that the period of time for shifting the target by one digit has elapsed, the program advances to step S11 in which the target note flag is set. Subsequently, in step S12 (FIG. 10), the target direction is judged in accordance with the target direction flag. If the target is moved to the right, the program advances to step S13. It is judged in this step whether the target is in the first display frame. If it is judged that the target is not in the first display frame, the calculation of "(target digit) − 1" is performed in step S14. The program then advances to step S15. On the other hand, if it is judged in step S12 that the target is moved to the left, it is judged in step 16 that the target digit is in the 8th digit. If it is judged that the target digit does not coincide with the 8th digit, the calculation of "(target digit) + 1" is performed in step S17. The program then advances to step S15. In this case, since the target direction flag is set to "0" and the target is shifted to the right, the program advances to step S15 through steps S12, S13 and S14. The content of stage data is judged in step S15. If it is judged that the contents of stage data corresponds to variation 2, 3 or 5, the target is shifted in the curved pattern. Thus, the program advances to step S18 in which target data is renewed in accordance with the stage, target digit, target data and the target direction flag and is set. Thereafter, the program advances to step S19 in which display data is set. On the other hand, if it is judged that the contents of stage data corresponds to variations 1 or 4, the target is moved straight. Therefore, the target data need not be changed and the program advances to step S19 directly. In step S19, data corresponding to target display, missile display, and symbol display of the number of missiles are set. In step S20, the digit (display frame number) of the target and the digit of the missile are compared. If they do not coincide, the program advances to step S21 (FIG. 13). It is judged in this step whether the target time data is set to "0". If it is judged to be "0", the target time data is set and the program advances to step S23. On the other hand, if the target time data is judged not to be "0" in step S21, the program advances to step S23 directly. It is judged in this step whether the missile time data is set to "0". If it is judged to be "0", the program advances to step S24 in which the missile time data is set. Thereafter, the program advances to step S25. On the other hand, if the missile time data is judged not to be "0", the program advances to step S25 directly. The game state display in the same manner as in step S6 is performed. The target is shifted from the 8th digit to the 7th digit, as shown in FIG. 16A(c). At this time, in step S26, a sound corresponding to a note flag is produced. In this case, since the target note flag has been set in step S11, the target shift sound is produced. Thereafter, In step S27 (FIG. 14), the note flag is discriminated. If the note flag is not present and if the note flag for the missile shift sound is set, the program returns to step S7. In this manner, when one of the missile keys $12_{10}$ to $12_{12}$ is not pressed, the series of steps described above is repeated. Thus, the target is sequentially shifted from the 8th digit to the 1st digit and the target shift sound is simultaneously produced. When the target is shifted to the first digit and the period of time corresponding to the shift of one digit elapses, the target collides against the right wall of the liquid crystal display element unit $34_1$ and the program advances from step S13 to step S28. In step S28, 8 missiles are subtracted from the current number of missiles. Further, it is judged in this step whether the subtracted result is "0" or more. It it is judged to be "0" or more, the program advances to step S29 and the collision note flag is set. At the same time, in step S30, the target direction flag is inverted and set. Further, in step S31, target data is set in accordance with a random number from the random number generator 20. Thereafter, the program advances to step S19. Thus, since the target direction flag is inverted in step S30, the target is shifted from the 1st digit to the 8th digit, that is, from the right to the left. When the target reaches the 8th digit and the period of time corresponding to the shift of one digit elapses, the target collides against the left wall of the liquid crystal display element unit $34_1$. The program advances to step S28 from step S12 through step S16. As a result, in steps S28 to S31, the calculation of the "(number of missiles) − 8", the setting of the collision sound note flag, the inversion setting of the target direction flag, and the setting of target data are performed as described above. In the same manner, the target is shifted to the right or left.

As shown in FIGS. 16A(d) to 16A(f), assume that the target ⊟ is shifted to the right and reaches the fourth digit and the low missile launch key $12_{12}$ is pressed. It is judged in key sampling step S7 whether the key input signal is present. The program advances to step S32. In step S32, the missile digit, missile time data, and missile data are set in accordance with the depression of the missile launch keys $12_{10}$, $12_{11}$ and $12_{12}$ in the high, middle and low altitudes, respectively. The missile digit is set by the target direction flag. In particular, when the target is to be shifted to the right, the 1st digit is set as the missile digit. On the other hand, when the target is to be shifted to the left, the 8th digit is set as the missile digit. Thereafter, the program advances to step S20 through step S19. In step S20, the target digit is compared with the missile digit. In this condition, since these digits do not coincide, the program returns to step S7 through steps S21, S23, S25, S26 and S27. Steps S7 to S10 are repeated and the calculation of the "(missile time data) − 1" and the "(target time data) − 1" is performed in steps S9 and S10. In this case, since the target speed is faster than the missile speed, the calculated result in step S9 becomes "0" before the calculated result in step S10 becomes "0". The program advances to step S33 and the missile note flag is set. Subsequently, it is judged in step S34 whether the target shift direction is set to the right or left. In this case, since the target is shifted to the right, the program advances to step S35 and the missile digit number is incremented by one. When the target is shifted to the left, the program advances to step S36 and the missile digit number is decremented by one. Thereafter, the variation number is checked in step S37. If variation 4 or 5 is initiated, missile data is set in step S38 and the program advances to step S39 since the trajectory is in the curved pattern. On the other hand, if variation 1, 2 or 3 is initiated, the program advances to step S39 directly, since the trajectory is straight. In fact, variation 1 is initiated at present, so that the program directly advances to step S39 from step S37. Judgment of the coincidence between the target digit and the missile digit is performed in step S39. In this case, the target is located in the 4th digit (FIG. 16A(f)) and the missile is located in the 1st digit. The program advances to step S40 in which the "(target time data) − 1" is calculated. Further, it is judged in this step whether the calculated result is "0". If it is judged to be "0", the program returns to step S11. On the other hand, if the calculated result is judged not to be "0", the program advances to step S19. In step S39, when the target digit and the missile digit are judged to coincide, the program advances to step S19 immediately. In this step, display data is set. Thereafter, the program advances to step S25 through steps S20, S21, S23 and S24. The game state is displayed in step S25. At this time, the missile is displayed at the second digit. The missile shift sound is produced in step S26. The program returns to step S7 through step S27. In this manner, the missile is shifted to the left every time the missile time data is set. On the other hand, the target is shifted to the right every time the target time data is set. Thus, the target and the missile are displayed at the same digit of the liquid crystal display element unit $34_1$, as shown in FIG. 16A(h). The coincidence of the target digit and the missile digit is detected in step S39 or S20. The program advances to step S41 from step S20. It is judged in step S41 whether the displayed symbol is the completed figure "日". When the coincidence of the target and missile altitudes is detected in step S42 or when it is judged in step S41 that target data is data corresponding to the complete (extra) figure "日", the program advances to step S43. It is judged in step S43 whether a decimal point (DP) is present in the display frame (digit) where the target and missile digits coincide. If the decimal point is judged to be present in this digit, the decimal point where the target and missile digits coincide is cleared in step S44. The program then advances to step S45. It is judged in step S45 whether target data is data of the extra complete figure "日". If it is judged not to be the extra complete figure, the missile is considered to hit a regular target and the complete figure is made up. Thus, the hit note flag is set in step S46. On the other hand, if the figure is judged to be the extra complete figure, the missile is considered to hit the extra target and the extra note flag is set in step S47. Thereafter, the program advances to step S48 to clear the missile data and then in step S49 the target direction flag is inverted and set. The calculation of the "(number of continuous hits)+1" is performed in step S50. The calculated result is stored in the B register of the memory section 24. The program then advances to step S51. In step S51, the digit number in which the missile hit the target is calculated and the calculated result is added to the extra number stored in the corresponding digit of the A register. The program further advances step S52. It is judged in step S52 whether target data is data of the extra complete figure. If it is judged not to be the extra complete figure, the program advances to step S53 and data for the number of continuous hits is set in a counter. This counter is formed by a digit of the E register in the memory section 34, for example. In step S54, the basic points are counted and added to the accumulated points. For example, 10 points are counted for variation 1. The calculation of the "(count value)−1" is performed in step S55. Further, it is judged in step S55 whether the calculated result is "0". If it is judged not to be "0", the program returns to step S54. In steps S54 and S55, the number of continuous hits is multiplied by the basic points. If the calculated result in step S55 is "0", the program advances to step S57. However, if the target data is judged to be the extra complete figure "日" in step S52, the program advances to step S56 in which extra points, that is, ten times the basic points are calculated. The program then advances to step S57. It is judged in this step whether the number of continuous hits is "8". If it is judged to be "8", the reward for perfect firing, that is, one hundred times the basic points is added and the program advances to step S59. On the other hand, if the number of continuous hits is judged not to be "8", the program advances to step S59 (FIG. 13) immediately. The accumulated score is compared with the highest score in the previous games. If the accumulated score is higher than the highest score, the accumulated score is stored as the highest score in step S60. On the other hand, in step S59, if the accumulated score is judged to be lower than the highest score, or if step S60 is completed, the program advances to step S21 as described above. The program then advances to steps S22, S23 and S24. Further, in step S25, the game state is displayed. In step S26, the hit sound is produced. In the game state according to step S25, the missile hits the target and a complete figure is made as shown in FIG. 16A(h). Thereafter, in step S27, the note flag is discriminated. The note flag at this time is the hit note flag, so that the program advances to step S61. It is judged in step S61 whether all the decimal points have been cleared. However, actually, all the decimal points have not been cleared, so that the program advances to step S62. It is judged in this step whether the extra number the data of which is stored in the memory section 24 is a multiple of 10. If it is judged not to be a multiple of 10, the program advances to step S63. In step S63, target data is set in accordance with the random number. Thereafter, the program returns to step S6 and the game state is displayed. As shown in FIG. 16A(i), the target is changed from the figure "日" to the figure "日". At the same time, the target is shifted to the left.

Figure 16B:
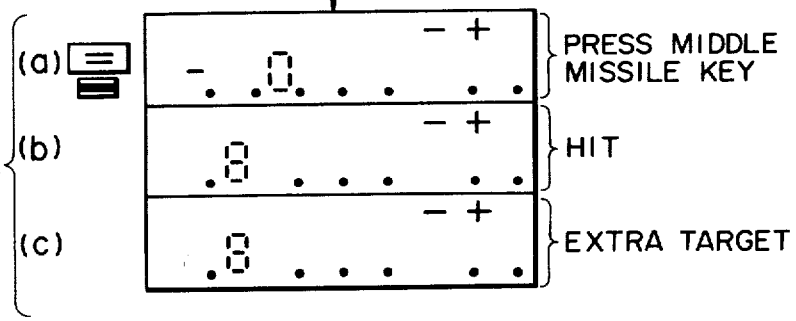

When the figure "日" is displayed as the target, as shown in FIG. 16B(a), the middle missile launch key $12_{11}$ must be pressed. When the middle missile launch key $12_{11}$ is pressed, the missile at the middle altitude is launched from the 8th digit, that is, 8th effective firing range (8th display frame). The flow of operation beginning from step S7 is performed. Assume that the missile hits the target in the 7th digit, as shown in FIG. 16B(b). The complete figure "日" which indicates the hit state is displayed in step S25 and the hit sound is produced in step S26. The program advances to step S62 through steps S27 and S61. It is judged in step S62 whether the extra points are a multiple of 10. As described above, when the missiles hit the targets in the 3rd and 7th digits in the order named, the number of extras is figured out to be "10=7+3" which is a multiple of 10. As a result, the program advances from step S62 to step S64. Data "000" for the extra target, that is, the extra complete figure "日" is set in step S64. The program then returns to step S6. Therefore, in step S6, as shown in FIG. 16B(c), the complete figure "日" as the extra target is displayed. When the missile launched by any one of the missile launch keys $12_{10}$ to $12_{12}$ hits the extra target, this is confirmed in step S41 when the missile and target digits coincide. However, when the decimal point is not displayed in this digit, the missile is considered to have missed the target as described below. Further, when the missile hits the extra target, it is confirmed in steps S45 and S52. The extra note flag is set in step S47 and the exra points are added to the accumulated score in step S56.

FIG. 16C(a) shows a case in which the target is shifted to the right and collides against the right wall of the liquid crystal display element unit $34_1$. In this case, the program advances from step S12 to step S28 through step S13. Eight missiles are decremented from the remaining number of missiles in step S28. Thereafter, the operation starting from step S29 is performed.

In step S25, as shown in FIG. 16C(b), only the symbol "+" is displayed so as to indicate that the number of missiles is reduced to the range of 9 to 16. At the same time, the target ⌐¬ is displayed in the 1st digit and the collision sound is produced in step S26. The program then returns to step S7.

When the above target is shifted to the left and when one of the missile launch keys $12_{10}$ to $12_{12}$ is erroneously pressed, that is, when the missile launch key $12_{10}$ or $12_{12}$ which does not coincide in level with the target is pressed, coincidence between the missile and target digits cannot be detected in accordance with data compared in step 42 even if the missile and target digits coincide. The miss A note flag is set in step S65 and the missile data is cleared in step S66. Thereafter, in step S67, data for the number of continuous hits is cleared. In step S68, the "(number of missiles)−1" is calculated. Further, it is judged in this step whether the calculated result is "0". As shown in FIG. 16D(a), even if the missile launch key $12_{11}$ is properly pressed and even if the target digit coincides with the missile digit, the program advances to step S69 from step S43 when the decimal point is not present in this digit. In step S69, the miss B note flag is set and the missile data is cleared in step S70. Further, as shown in step S71, the target direction flag is inverted and set. The program advances to step S68 through step S67. In step S68, the "(number of missile)−1" is calculated. If the calculated result is "0", all the missiles are considered to have been launched. Thus, the program advances to step S72 and the game over sound is produced. At the same time, in step S73 the symbol "OVER" and the total accumulated score are displayed. Thus, the game is over. However, if the calculated result in step S68 is not "0", there are still some missiles remaining so that the program advances to step S21 and the game is continued. When the miss A note flag and the miss B note flag are set, the program advances to step S74 from step S27. The "(target time data)−1" is calculated in the A resister. In other words, when the missile misses the target, the target speed is increased. It is then judged in step S75 whether the miss A note flag is set or the miss B note flag is set. If it is judged that the miss A note flag is set, the original target remains. Thus, the program returns to step S7 and the missile launch keys $12_{10}$ to $12_{12}$ are ready. On the other hand, if it is judged that the miss B note flag is set, the target data is set in accordance with the random number in step S63. The program then returns to step S6 so as to display the game state as shown in FIG. 16D(c). Since the target direction flag has been inverted and set in step S71, the target direction is reversed and the target is shifted from the right to the left.

In this manner, when the game is continued and only one decimal point is displayed, as shown in FIG. 16E(a) and when the missile hits the target in the digit where only one decimal point is present, in step S61, all the decimal points are judged to be cleared. The program then advances to step S76 and the stage clear sound is produced. Further, in step S77, conditions for the next stage, that is, conditions for stage 2 of variation 1 are set. Simultaneously, 16 missiles are added and the program advances to step S78. It is judged in step S78 whether the number of extras is a multiple of 10. If it is judged to be a multiple of 10, data "000" for the complete figure "⌐¬" is set in step S79. On the other hand, if the number of extras is judged not to be a multiple of 10 or when the operation in step S79 is completed, the program advances to step S80. In step S80, the accumulated score and the variation number are set and displayed, as shown in FIG. 16E(e). In step S5, the display time is checked. When the predetermined period of time, that is, 1 second, elapses, the program advances to step S6 and a game corresponding to the next stage is started.

In the same manner as described above, while the missiles remain, the game is continued, as shown in FIG. 16F(a) to 16F(i). Every time three stages are finished, the next variation is initiated. When the final stage, that is, stage 3 of variation 5 is completed and when missiles still remain, stage 1 of variation 3 is set. Thereafter, the stages of variation 3 are repeatedly set while the missiles remain. After variation 2, the target route and trajectory are determined according to a combination of straight and curved patterns as shown in FIG. 5. Further, the target route and the trajectory may be determined by a combination of curved patterns. As shown in FIG. 16F(c), the missile launch keys $12_{10}$ to $12_{12}$ is to be pressed anticipating changes in target routes and trajectories. As shown in FIG. 16G(c), when all the missiles are used up, the game is over and the highest score is displayed. In the above embodiment, while the missile launched in step S7 is being displayed, the next missile cannot be launched. Further, every time the missile misses the target, the target time data is decremented by one in step S74. The target speed is thus increased.

Further, in the above embodiment, the electrode of the "⌐¬" shape is used. However, another electrode of a "⊟" shape may be used. Alternatively, the display section may be constituted by the dot display system in order to practice the present invention to obtain the same effects as in the above embodiment.

Further, in the above embodiment, the non-displaying part of the figure "⌐¬" is formed as the target. With the missile launch keys, the missile, the shape of which corresponds to the non-displaying part of the completed figure, hits the target to complete the figure. However, a non-displaying part of a predetermined shape such as letters and numbers may be formed as the target to be fitted by the shape of the missile.

Further, in the above embodiment, the present invention is applied to the electronic calculator. However, the present invention may be applied to other compact electronic equipment with a data display section which displays numbers and the like, such as an electronic watch.

Other changes and modifications may be made within the spirit and scope of the present invention.

What is claimed is:

1. As electronic game apparatus which comprises:
    display means for displaying a plurality of signs;
    memory means, connected to said display means, for storing at least target data to display a predetermined sign except part thereof among the plurality of signs, missile data for displaying a missile a shape of which corresponds to a non-displayed part of the predetermined sign so as to complete the shape of the predetermined sign, data for shifting the target and the missile, and data for scoring a point when the missile hits the target;
    arithmetic and logic means, connected to said memory means, for calculating shift patterns of the target and the missile, for comparing a position of the non-displayed part of the target and a position of the missile, and for calculating the score when the position of the non-displayed part of the target and the position of the missile are judged to coincide;

control means, connected to said display means, said memory means and said arithmetic and logic means, for controlling at least data transfer from said memory means to said display means, data transfer from said memory means to said arithmetic and logic means and from said arithmetic and logic means to said memory means, and arithmetic and deciding operation of said arithmetic and logic means; and input key means, connected to said control means, for entering missile data, whereby said control means controls said display means, said memory means and said arithmetic and logic means on the basis of input data so as to allow performance of the game while displaying the movement of the target and missile at said display means.

2. An electronic game apparatus according to claim 1, wherein said display means is capable of displaying at least a series of numbers and decimal points a number of which corresponds to the number of the series of numbers.

3. An electronic game apparatus according to claim 1, wherein said memory means comprises a plurality of registers, at least one register of which stores at least target data, missile data, target and missile shift data and score data, and other registers of which store data used for display at said display means and data used for operation in said arithmetic and logic means.

4. An electronic game apparatus according to claim 1, wherein said control means controls said memory means and said arithmetic and logic means so as to shift the missile in a direction opposite to a shift direction of the target, and further controls said arithmetic and logic means so as to compare a digit of the missile with a digit of the target which has the non-displayed part and, when coincidence occurs, to then judge coincidence between the target position and the missile position in the digit in order to determine whether the missile hits the target.

5. An electronic game apparatus according to claim 1, wherein said input key means has missile launch keys for launching missiles at different altitudes corresponding to an altitude of the non-displayed part of said target.

6. An electronic game apparatus according to claim 1, wherein said input key means has a mode selection switch for selecting a calculation mode or a game mode, numerical keys and function keys, said input key means performing normal calculation in the calculation mode, and launching the missile with the numerical keys or the function keys in the game mode.

7. An electronic game apparatus according to claim 1, wherein said control means controls said display means, said memory means and said arithmetic and logic means so as to perform the same functions as an electronic calculator in accordance with input data received through said input key means.

8. An electronic game apparatus according to claim 1, wherein the target is one of the figures the high, middle or low horizontal segment of which is missing from a figure of an 8 shape as a display element.

9. An electronic game apparatus according to claim 1, further including random number generating means, connected to said control means, for setting targets with a different non-displayed part on the basis of a random number output from said random number generating means.

10. An electronic game apparatus according to claim 1, further including a sound generating means, connected to control means, for generating indicating sounds at predetermined stages in a game.

* * * * *